Nov. 5, 1957  N. A. GUSSACK  2,812,222
PERMANENT BALL RETAINER FOR SLIDING MEMBERS
Filed June 18, 1954  2 Sheets-Sheet 1
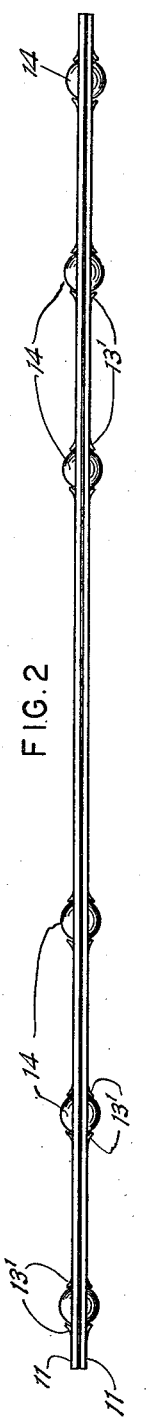
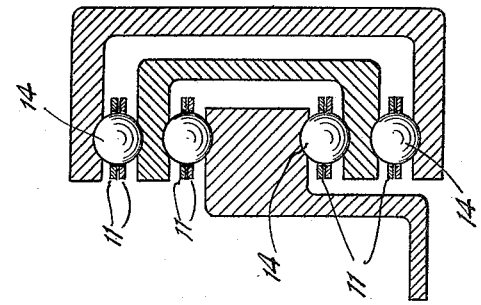
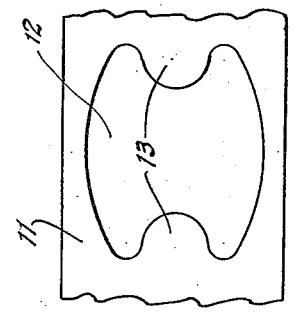
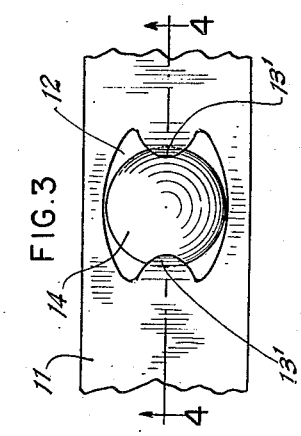
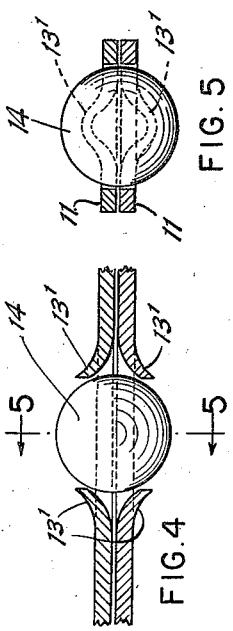
INVENTOR
Nathan A. Gussack
BY
Irving Seidman
ATTORNEY Nov. 5, 1957   N. A. GUSSACK   2,812,222
PERMANENT BALL RETAINER FOR SLIDING MEMBERS
Filed June 18, 1954   2 Sheets-Sheet 2
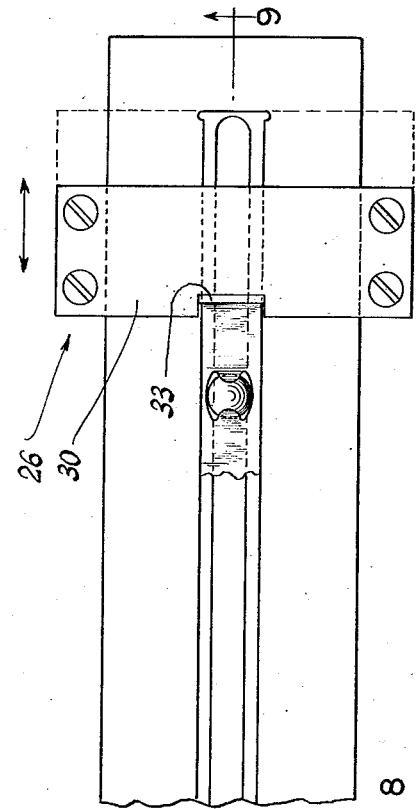
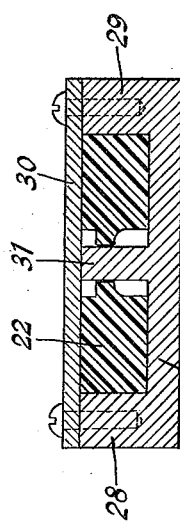
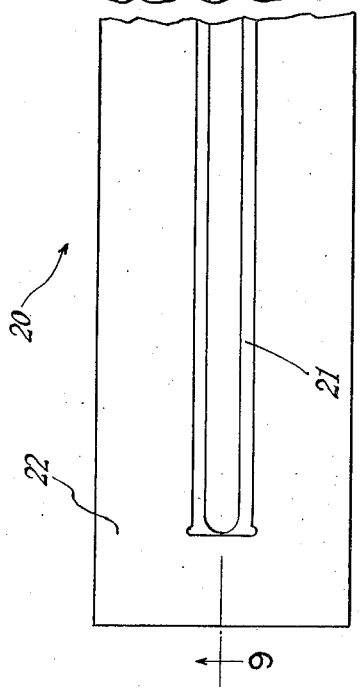
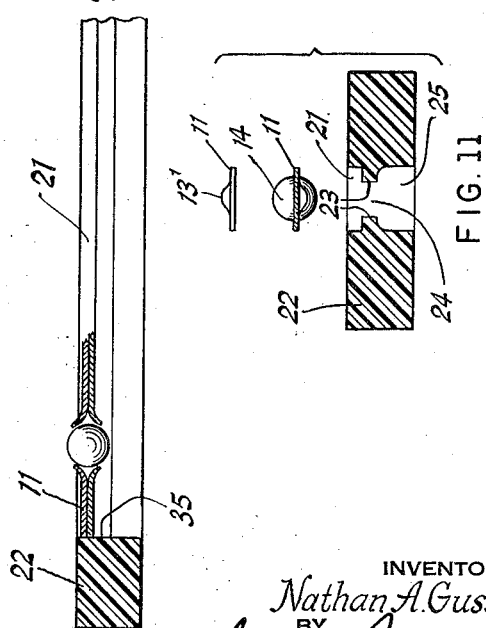
INVENTOR
Nathan A. Gussack
BY
Irving Seidman
ATTORNEY 2,812,222

PERMANENT BALL RETAINER FOR SLIDING MEMBERS

Nathan A. Gussack, Flushing, N. Y., assignor to Grant Pulley & Hardware Corporation, Flushing, N. Y., a corporation Application June 18, 1954, Serial No. 437,753

2 Claims. (Cl. 308—6)

This invention relates to ball retainers for sliding members.

Broadly, it is an object of the invention to provide a permanent ball retainer for sliding members which can be rapidly assembled and disassembled when used with sliding members of various kinds, such as drawer slides, display slides, etc.

More specifically, it is an object of the invention to provide ball retainers in which the balls are accurately and positively positioned in predetermined spaces and which permit the balls to rotate freely.

A further object is to provide ball retainers which can be cheaply and rapidly produced without loss of balls during the assembly process and which can be varied in length and size or cross-section and in which the balls may be spaced in any desired portions of the retainer and varied in number, as desired.

A further object is to provide a ball retainer which will rattle less than the ball retainers heretofore used.

In ball retainers heretofore used, the balls would scatter unless great care was taken when the slides were taken apart. Also, in the assembly of slides the balls would be apt to roll away and be lost and much more time would be taken to assemble slides than with my permanent ball retainers. Ball retainers heretofore used were also more noisy during movement and the spacer bar would drop below the medial line of the balls causing excessive friction and wear.

For a fuller understanding of the nature and objects of the invention reference is had to the following detailed description in connection with the accompanying drawing, in which:

Fig. 1 is a plan view of a ball retainer showing six hardened steel balls uniformly spaced apart from the center of the retainer.

Fig. 2 is a side elevational view of the ball retainer shown in Fig. 1.

Fig. 3 is an enlarged top or plan view of one ball and a part of the ball retainer.

Fig. 4 is a sectional view taken through line 4—4 of Fig. 3.

Fig. 5 is a sectional view taken along line 5—5 of Fig. 4.

Fig. 6 is a vertical cross-sectional view of a multiple slide showing the ball retainers between the sliding members.

Fig. 7 is an enlarged plan view of a portion of a flat metal spacer bar showing the form of the shaped hole.

Fig. 8 is a plan view of a fixture for spot welding the self retaining ball spacers, showing parts broken away to show a spacer bar and a ball within the fixture.

Fig. 9 is a sectional view taken through line 9—9 of Fig. 8.

Fig. 10 is a sectional view taken through line 10—10 of Fig. 9.

Fig. 11 is an exploded view showing an end view of part of the fixture, a spacer bar with ball therein and the covering spacer bar.

Referring to the drawing, numeral 10 represents a ball retainer comprising a pair of flat metal spacer bars or members 11 of uniform thickness, length and width. A series of shaped holes 12, as shown in Fig. 7, are punched in each bar 11 at predetermined positions, the holes 12 having inwardly directed semi-circular extensions 13 which are bent slightly upwardly forming opposed lugs 13', as best shown in Figs. 2 and 4.

It is to be particularly observed that the holes 12 have opposed edges of substantially greater radius than the respective balls to be disposed therein and it is to be further observed that the opposed lugs 13' have their edges convex with respect to the centers of the holes whereby each ball 14 supported in the retainer 10 is wholly confined by point contact, which points include one on each opposed edge of the hole, and one at the tip of each lug 13' or six points in all. Such specific mounting of the balls provides for free rotation thereof with a minimum of friction.

Referring to Figs. 8 to 11, inclusive, numeral 20 represents a fixture for retaining the spacer bars 11 within a channel or recess 21 prior to spot welding the pair of spacer bars together. The fixture 20 is comprised of a body member 22 made of a plastic material, such as linen Bakelite, and having a channel or recess 21, a pair of opposed shoulders 23, a central narrow opening 24 and a wider, lower opening 25. Attached at one end of the body member 22, is a reciprocating sliding block 26, comprising a base member 27 with two opposed sides 28, 29 and a recess therebetween to slidably receive the body member 22. A cover member 30 is attached to the sides 28, 29 to prevent the sliding block 26 from becoming separated or disengaged from the body member 22 and has a central recess 33 slightly wider than the width of the spacer bars 11. Integral with the base member 27 is a central pusher member 31 which slides between shoulders 23 and is used for aligning the spacer bars 11 by movement of the sliding block 26 towards the center of the body member, as indicated by the arrow in Fig. 8. The back 32 of the pusher member 31, in its movement to the right, stops against the inner face 34 of the body member 22 which is a fixed stop, and, in its movement to the left, strikes against the right ends of the pair of spacer bars 11 within channel 21 moving said spacer bars 11 against the inner left face 35 of body member 22, aligning both spacer bars 11 ready for spot welding. The electrodes (not shown) of the spot welder contact the spacer bars 11 from the top and bottom or back of the longitudinal central recess or openings 21, 25 of the body member 22.

In assembling the unit, a spacer bar 11, with its lugs 13' directed downwardly is manually moved into a ball reservoir and a set of hardened steel balls 14 is scooped up, the balls easily falling into each hole 12. The spacer bar 11 containing the balls 14 is then placed with its lugs down within a fixture having a fixed stop 34 at one end and a sliding stop at the other end. A similar spacer bar 11 of the pair of spacer bars is then placed upon the lower spacer bar 11 over the balls 14 so that the holes 12 coincide with one another, and the balls 14 lying within the openings 12 and between the four lugs 13', as best shown in Fig. 4. The two opposed bars 11, back to back, are then spot welded as indicated by spots 15 forming a permanent ball retainer in which the balls 14 rotate freely and cannot be dislodged.

Such ball retainers have a multiplicity of uses and are easily and readily used between the sliding members of sliding devices commonly used with drawers, cabinets, etc.

It will be seen that the ball retainers are rapidly and easily assembled without loss of balls 14. When used in sliding devices, a section of one of which is shown in Fig. 6, the balls always remain centrally and rotatively positioned along the longitudinal medial line of the ball retainer. There is no danger of the spacer bars 11 dropping, as in spacer bars heretofore used, so that excessive friction and noise and rattling in movement is virtually eliminated.

If a slide is disassembled, the ball retainers can be easily removed without danger of losing the balls 14 since such balls are permanently positioned between the lugs 13.

It is obvious that the length of the bars 11 can be varied as well as the width and thickness to accommodate different sizes and weights of balls and in such cases the size and bend of the lugs 13' would be varied accordingly. Also, the spacing of the balls may be varied, as desired.

I claim:

1. A method of assembling a permanent ball retainer for sliding devices comprising a pair of opposed spacer bars having uniform coinciding holes with opposed upwardly directed lugs, by first scooping up a set of balls from a ball reservoir with one of said spacer bars having its lugs directed downwardly, then laying said spacer bar with the set of balls within its holes within a fixture having a fixed stop and a sliding stop, said fixture having its back open to permit spot welding, then placing the other of said spacer bars of the pair of spacer bars with its lugs directly upwardly upon the first spacer bar having the balls within its holes so that the holes of the two spacer bars coincide with one another, then moving said sliding stop against one end of said pair of spacer bars to hold and align said pair of spacer bars, then spot welding said spacer bars together forming a permanent ball retainer.

2. A permanent ball retainer for sliding devices comprising a pair of flat rigid bars, each bar being provided with longitudinally spaced holes, said bars being rigidly secured together in face to face relation with the holes in one axially alined with the holes in the other, thereby providing a series of pairs of holes in each of which a ball is rotatably supported, the holes having opposed curved edges of a radius substantially greater than that of the balls, and the holes each being provided with a pair of lugs intermediate said curved edges and projecting inwardly toward the axis of the holes and which lugs have convex edges, and the said lugs of the opposed bars projecting away from a plane disposed between the bars, whereby said curved edges and said lugs provide six points of contact for the respective ball with a minimum of friction in the rotation thereof.

References Cited in the file of this patent

UNITED STATES PATENTS

| | | |
|---|---|---|
| 1,005,055 | Miller | Oct. 3, 1911 |
| 1,234,805 | Rixson | July 31, 1917 |
| 1,894,595 | Mitchel | Jan. 17, 1933 |
| 2,346,167 | Jones et al. | Apr. 11, 1944 |

FOREIGN PATENTS

| | | |
|---|---|---|
| 245,763 | Switzerland | Nov. 30, 1946 |